United States Patent [19]

Fukami et al.

[11] 4,412,425
[45] Nov. 1, 1983

[54] AIR CONDITIONING AND VENTILATION SYSTEM

[75] Inventors: Akira Fukami, Okazaki; Hiroki Noguchi, Oobu; Kunio Okamoto, Okazaki, all of Japan

[73] Assignee: Nippon Soken, Inc., Nishio, Japan

[21] Appl. No.: 327,615

[22] Filed: Dec. 4, 1981

[30] Foreign Application Priority Data

Dec. 9, 1980 [JP] Japan .................................. 55-174055
Feb. 18, 1981 [JP] Japan .................................. 56-22807

[51] Int. Cl.³ ........................................... B60H 3/04
[52] U.S. Cl. ...................................... 62/244; 98/2.06
[58] Field of Search ................ 62/239, 244, 441, 412; 98/2.06, 2.11; 165/41, 42

[56] References Cited

U.S. PATENT DOCUMENTS 2,724,556 11/1955 Brubaker ......................... 98/2.06 X
2,787,205 4/1957 Wilfert .................................. 98/2.06
3,301,484 1/1967 De Castelet ..................... 98/2.06 X
3,906,740 9/1975 Thomas .............................. 62/244 X Primary Examiner—Lloyd L. King
Attorney, Agent, or Firm—Cushman, Darby & Cushman

[57] ABSTRACT

An air conditioning and ventilation system for a motorcar has an outdoor air passage for introducing fresh outdoor air into the passenger room and another passage for guiding room air to the atmosphere. The two passages intersect at a point where a heat exchanger is provided for exchanging both of the actual heat and the latent heat of the airs flowing through the two passages. Air heating and cooling units are provided in the outdoor air passage downstream of the heat exchanger. The outdoor air flows first through the heat exchanger in heat exchanging relationship with the room air flowing therethrough outwardly and thus is heated or cooled by the room air, whereby the thermal load on the air heating and cooling units is greatly reduced.

7 Claims, 8 Drawing Figures

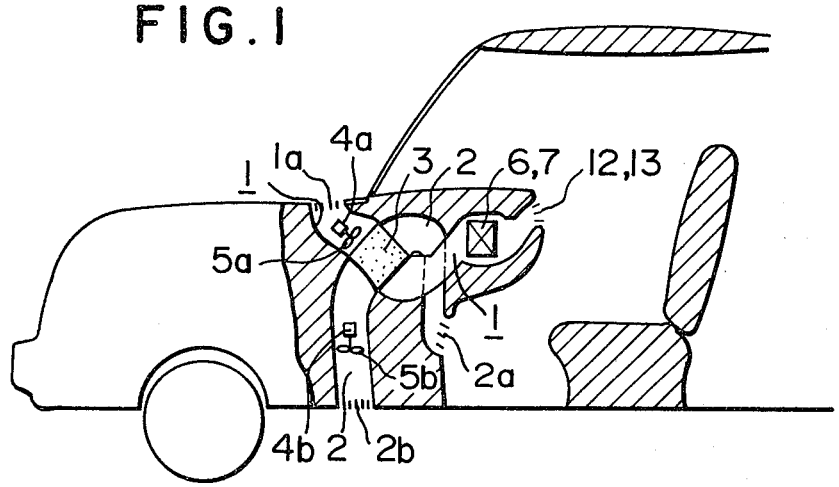
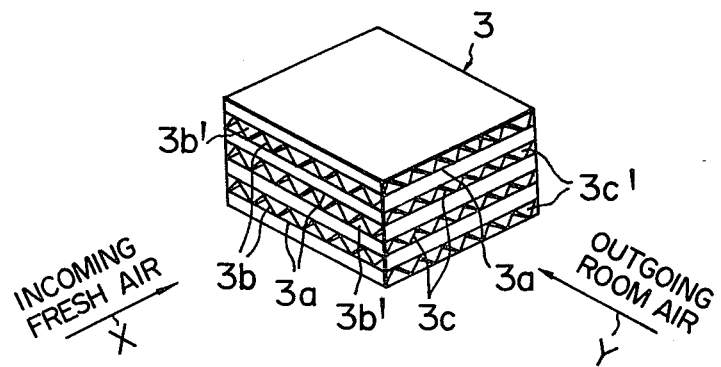
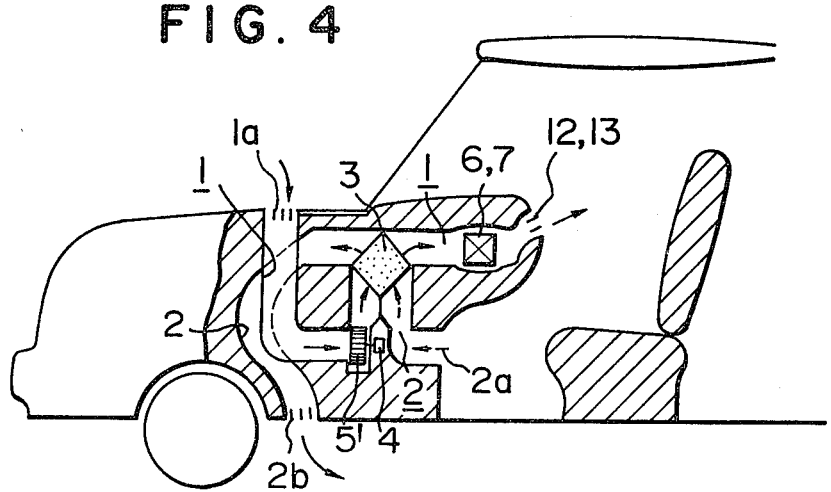

AIR CONDITIONING AND VENTILATION SYSTEM

BACKGROUND OF THE INVENTION

1. Field of the Invention

The present invention relates to an air conditioning and ventilation system for vehicles.

2. Description of the Prior Art

Recently, an increased number of vehicle are equipped with air conditioning systems to give improved comfort to drivers and passengers. The prior art air conditioning system for vehicles has a room air passage, an outdoor air passage and a damper which is operable by an operator through a mechanical linkage so that the introduction of the fresh outdoor air and the recirculation of the room air are switched over. In the prior art conditioning system, if the change-over damper is placed for a long time in a position to recirculate the room air, the room air becomes polluted by the breathing and smoking of passengers. On the other hand, if the change-over damper is placed for a long time in a position to introduce the outdoor air only into the passenger room, a larger amount of thermal load will be exerted to the air heating and cooling systems, with a resultant disadvantage that the fuel consumption of the engine is increased.

SUMMARY OF THE INVENTION

It is an object of the present invention to provide an improved air conditioning and ventilation system for vehicles in which the thermal load on the air conditioning means is greatly reduced than in the prior art system.

The air conditioning and ventilation system according to the present invention has an outdoor air passage for introducing fresh outdoor air into the passenger room of a vehicle and another passage for guiding room air to the atmosphere. The two passages intersect at a point where a heat exchanger is provided for exchanging both of the actual heat and the latent heat (humidity) of the airs flowing through the two passages. Air heating and/or cooling units are provided in the outdoor passage downstream of the heat exchanger. The outdoor air flows first through the heat exchanger in heat exchanging relationship with the room air flowing therethrough outwardly and thus is heated or cooled by the room air, whereby the thermal load applied by the outdoor air to the heating and/or cooling units is greatly reduced than in the prior art air conditioning and ventilation system.

The above and other objects, features and advantages of the present invention will be made more apparent by the following description with reference to the accompanying drawings.

BRIEF DESCRIPTION OF THE DRAWINGS

FIG. 1 is a schematic illustration of a first embodiment of the air conditioning and ventilation system according to the present invention;

FIG. 2 is an enlarged perspective view of a heat exchanger used in the air conditioning and ventilation system according to the present invention;

FIG. 4 is a view similar to FIG. 1 but illustrates a second embodiment of the air conditioning and ventilation system of the invention;

DESCRIPTION OF PREFERRED EMBODIMENTS

Figure 3:
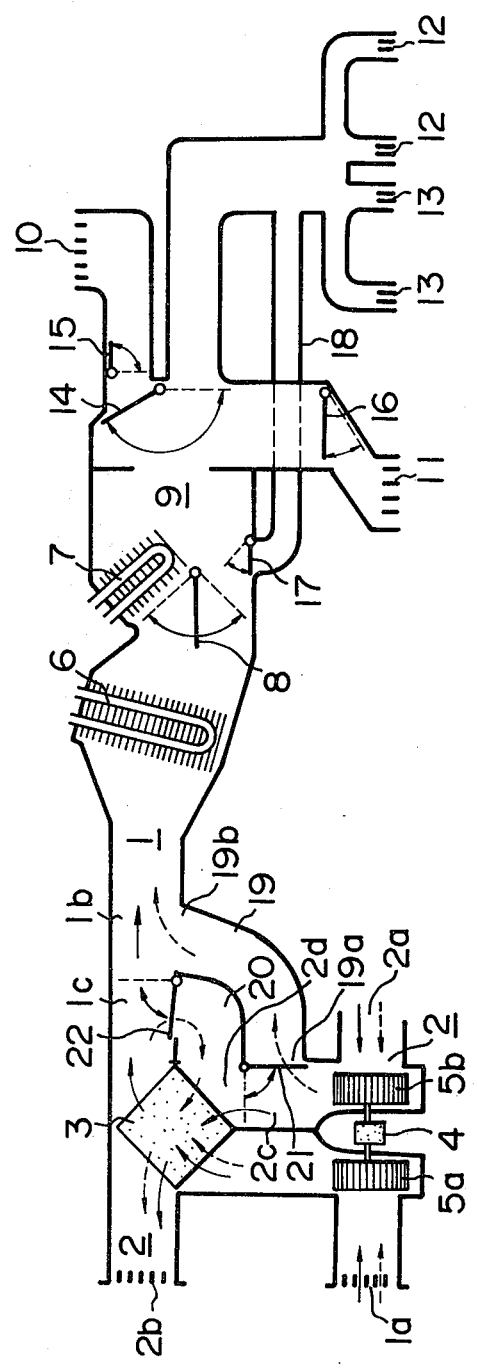
FIG. 3 is an enlarged diagrammatic illustration of the air conditioning and ventilation system shown in FIG. 1.

Referring to FIGS. 1 to 3 showing a first embodiment of the present invention, a motorcar is provided with a first passage 1 having an air inlet opening 1a formed in the outer surface of the motorcar at a point where fresh ambient air is caused to enter the passage 1 through the opening 1a when the motorcar is operated forwards. The motorcar is also provided with a second passage 2 having an air inlet opening 2a disposed in the passenger compartment or so called "room". The two passages 1 and 2 intersect at a point at which is disposed a heat exchanger 3 which is capable of exchanging both of the actual heat and the latent heat (moisture).

The heat exchanger 3 is shown in an enlarged scale and has a laminated structure formed by substantially flat partition sheets 3a made from Japanese paper and corrugated spacer sheets 3b and 3c each sandwiched between an adjacent pair of the partition sheets 3a. The corrugated spacer sheets 3b and 3c are arranged such that the ridge lines of the corrugation of the spacer sheets 3b are substantially at right angles to those of the spacer sheets 3c so that the spacer sheets 3b and the partition sheets 3a cooperate to define a first series of passages 3b' for the incoming fresh outdoor air indicated by an arrow X while the spacer sheets 3c and the partition sheets 3a cooperate to define a second series of passages 3c' for the outgoing room air indicated by an arrow Y. Thus, the incoming fresh air and the outgoing room air flow through the heat exchanger 3 at substantially right angles with respect to each other and separated by the partition sheets 3a so that the two kinds of air flows are placed in heat exchanging relationship in respect of the exchange of the actual heat and the latent heat.

The incoming fresh air passage 1 and the outgoing room air passage 2 are respectively provided therein with blowers 5a and 5b driven by motors 4a and 4b, respectively, to introduce fresh outdoor or ambient air and room air into the passages 1 and 2, respectively. An air-cooling heat exchanger or evaporator 6 and an air-heating heat exchanger or heater core 7 are disposed in the fresh air passage 1 between the heat exchanger 3 and air outlet openings 10, 11, 12 and 13 to be discussed later. An air damper 8 is disposed in the fresh air passage 1 to control the rate of the air flow through the heater core 7 to thereby control the temperature of the air flowing into the room. It will be apparent to those in the art that the air damper 8 may be operated either manually or by any conventional automatic position control means.

An air-mixing chamber 9 is provided in the passage 1 downstream of the damper 8 and the heater core 7. The chamber 9 is connected to several branch ducts which respectively terminate in the air outlet openings 10 to 13. The outlet 10 is a defrosting air outlet opening. The opening 11 directs air towards the feet of the driver and his assistant. The openings 12 and 13 direct air flows towards the driver's and assistant's faces, respectively. Dampers 14, 15 and 16 are provided to control the communication of the air outlet openings 10–13 with the air-mixing chamber 9 and may be operated either manually or by any conventional automatic position controlling means. An additional damper 17 is provided to control the supply of cool air into an auxiliary or bypass air passage 18. When the damper 17 is moved to its open position, a difference in temperature is produced between the air discharged into the room through the air outlet openings 12 and the air discharged into the room through the air outlet openings 13.

The section 2c of the room air passage 2 upstream of the heat exchanger 3 is connected by a first auxiliary passage 19 to the section 1b of the fresh air passage 1 downstream of the heat exchanger 3. The section 2d of the room air passage 2 between the upstream end 19a of the auxiliary passage 19 and the heat exchanger 3 is connected by a second auxiliary passage 20 to the section 1c of the fresh air passage 1 between the downstream end 19b of the auxiliary passage 19 and the heat exchanger 3. Dampers 21 and 22 are provided to open and close the first and second auxiliary passages 19 and 20, respectively, and are operatively associated with each other.

When the dampers 21 and 22 are in positions closing the first and second auxiliary passages 19 and 20, as shown by the solid lines, the fresh air passage 1 and the room air passage 2 are both unblocked. When the dampers 21 and 22 are in positions opening the first and second auxiliary passages 19 and 20, as shown by broken lines, the fresh air passage 1 and the room air passage 2 are both blocked. Arrows shown in FIG. 3 by solid lines indicate the paths of air flows through the passages 1 and 2 when the auxiliary passages 19 and 20 are closed, while arrows shown by broken lines indicate the paths of air flows when the auxiliary passages 19 and 29 are open.

With the structure and arrangement described above, when the auxiliary passages 19 and 20 are closed in summer season, the blower 5b is operative to suck the room air through the room air inlet 2a into the room air passage 2 and causes this air to flow through the heat exchanger 3 and then out of the passage 2 through the outlet opening 2b. On the other hand, the blower 5a is operative to suck fresh outdoor air through the air inlet 1a into the fresh air passage 1 and causes this air to flow through the heat exchanger 3 and past the air cooling heat exchanger or evaporator 6. When the two kinds of airs flow through the heat exchanger 3, they are subjected to heat exchange so that the substantial parts of the heat and humidity of the fresh outdoor air are removed by the outgoing room air whereby the incoming fresh air which has passed through the heat exchanger 3 is now at a lowered temperature and a lowered humidity. The thus cooled and dried fresh air is then subjected to the temperature control by means of the evaporator 6. It will therefore be appreciated that the thermal load applied to the evaporator 6 is greatly reduced than in the conventional air conditioning and ventilation system.

The system will also advantageously operative in winter season. Namely, the fresh incoming outdoor air, which is at a low temperature and at a low humidity, receives heat and humidity or moisture from the outgoing room air when the two kinds of airs are subjected to heat exchange at the heat exchanger 3. Thus, the thermal load on the heater core 7 is reduced than in the conventional air conditioning and ventilation system. Thus, the heater core 7 may be of reduced capacity and size as compared with these of the heater core used in the conventional air conditioning and ventilation system.

The partition sheets 3a of the heat exchanger have been described as being made from Japanese paper. In a modified heat exchanger 3, however, the partition sheets 3a are made from substantially flat paper-like sheet material formed by carbon fibers and cellulose fibers. The spacer sheets 3b are made from paper-like corrugated sheet material formed by activated carbon fibers, while the spacer sheets 3c are made from paper-like corrugated sheet material formed by carbon fibers and cellulose fibers. The sheets 3a, 3b and 3c are arranged such that the first series of passages 3b' defined between the sheets 3a and 3b form a part of the incoming fresh air passage 1 while the second series of passages 3c' defined between the sheets 3a and 3c form a part of the outgoing room air passage 2.

The partition sheets 3a can be made by mixing carbon fibers, cellulose fibers and fibrous polyvinyl alcohol and then forming the mixture into paper-like shape in a manner similar to the process of making Japanese paper. The spacer sheets 3b, which will be placed in contact with the fresh incoming air, can be made by activating carbon fibers, mixing the thus activated carbon fibers with fibrous polyvinyl alcohol and then making the mixture into paper-like shape. Similarly, the spacer sheets 3c, which are adapted to be placed in contact with the outgoing room air, can be made by mixing carbon fibers and fibrous polyvinyl alcohol and then forming the mixture into paper-like shape. The partition sheets 3a and the spacer sheets 3b and 3c can easily be made by utilizing the conventional paper-making technique.

In the modified heat exchanger 3 discussed above, the exchange of the heat (actual heat) is carried out mainly by the carbon fiber parts of the partition sheets 3 and the exchange of the latent heat (humidity) is carried out mainly by the cellulose fiber parts. This assures increased performance and minimization of the heat exchanger 3. The spacer sheets 3b to be placed in contact with the incoming fresh air include activated carbon fibers which advantageously adsorb any noxious gas and order contained in the incoming fresh air. The carbon fibers (namely, non-activated carbon fibers) and cellulose fibers, which form the primary or substantial parts of the spacer sheets 3c which are placed in contact with the outgoing room air, hardly adsorb organic compounds such as an order content. Thus, in the case where the outgoing room air contains offensive order content while the incoming fresh outdoor air is fairly clean, the order content of the outgoing room air is not adsorbed in the heat exchanger 3. Thus, the clean fresh outdoor air flowing through the heat exchanger 3 is not contaminated by any order content which would otherwise be adsorbed in the heat exchanger 3. Also in the case where the incoming outdoor air and outgoing room air both contain order contents, the order content of the incoming outdoor air is adsorbed in and removed by the heat exchanger 3 while the order content of the outgoing room air is discharged out of the system without being adsorbed in the heat exchanger 3. Thus, the heat exchanger 3 advantageously prevents recirculation of the order of the outgoing room air back into the room. The use of the activated carbon fibers provides a further advantage that the sheet material containing the activated carbon fibers is hardly burnt and is much safer than Japanese paper or the like material conventionally used in this kind of heat exchanger.

There will be a possibility that, if the incoming outdoor air contains an order or orders and the spacer sheets 3b of the heat exchanger 3 are exposed to the orders for a long time, the requirement for the removal of the order exceeds the order adsorption capacity of the activated carbon fibers of the spacer sheets 3b. In such a case, the damper 21 and 22 may be moved to the positions shown by broken lines in FIG. 3 so that the room air sucked by the blower 5b is caused to bypass the heat exchanger 3 and recirculated through the auxiliary passage 19 back into the room through the part of the fresh air passage downstream of the damper 22 and through the air outlet openings 10-13 and, at the same time, the outdoor air sucked by the blower 5a flows through the passages 3b' in the heat exchanger 3 into the section 1c of the fresh air passage 1 and is then caused to flow through the auxiliary passage 20 back into the passages 3c' in the heat exchanger 3 and discharged out of the system through the air outlet opening 2b. In other words, the outdoor air merely flows through the heat exchanger 3 twice and is not introduced into the passenger room of the motorcar.

The outdoor air will be refreshed or cleaned in certain period of time. When such condition is resumed, the order content which has been adsorbed in the spacer sheets 3b of the heat exchanger 3 will be removed therefrom by the refreshed and cleaned outdoor air. The activated carbon fiber sheets which form the spacer sheets 3b are thus refreshed and, thereafter, the dampers 21 and 22 will be moved back to the positions shown by the solid lines in FIG. 3 to resume the heat and humidity exchange operation of the heat exchanger 3.

In order to enhance the cleaning or refreshment of the heat exchanger 3, a heater (not shown) may be disposed in the incoming fresh air passage 1 upstream of the heat exchanger 3. When the dampers 21 and 22 are placed in the broken line positions to cause the outdoor air to flow through the passages 3b' in the heat exchanger 3 and again through the passages 3c' therein and if the heater is operated to heat the incoming outdoor air to heat the air flowing through the heat exchanger 3, the order content which has been adsorbed in the heat exchanger 3 can easily and smoothly be removed therefrom. In other words, even if the incoming outdoor air is not so clean, the incoming outdoor air if heated to an elevated temperature will enhance the removal of the order from the activated carbon fibers of the heat exchanger 3 and facilitates improved refreshment thereof.

Figure 5:
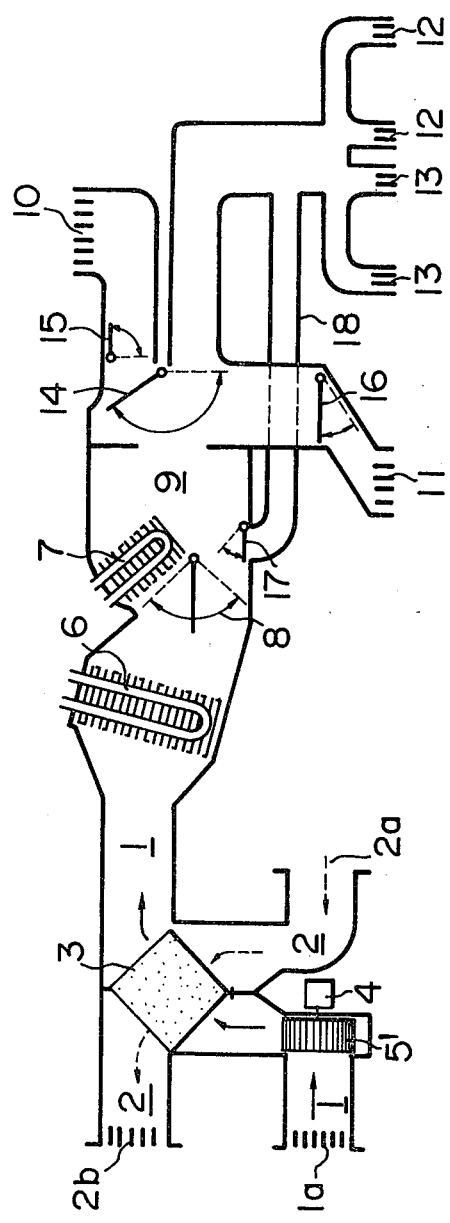
FIG. 5 is an enlarged diagrammatic illustration of the air conditioning and ventilation system shown in FIG. 4.

A second embodiment of the invention is shown in FIGS. 4 and 5 wherein the parts of the second embodiments similar to those of the first embodiment are designated by similar reference numerals. The difference of the second embodiment from the first embodiment is that the second embodiment is not provided with the first and second auxiliary passages 19 and 20 and the dampers 21 and 22 provided in the first embodiment and that the incoming fresh air passage 1 only is provided with a blower 5' driven by a motor 4 to introduce fresh outdoor air through the passage 1 into the passenger room.

The system of the second embodiment operates as follows: In summer season, the blower 5' is driven to suck fresh outdoor air through the fresh outdoor air inlet opening 1a into the passage 1 to cause the fresh air to flow through the heat exchanger 3 from which the fresh air flows through the evaporator 6 and through the outlet openings 10-13 into the room. The passenger room of the motorcar is substantially closed or sealed from the outdoor air except the inlet opening 2a of the outgoing room air passage 2. Accordingly, while the passage 2 is not provided with any air discharging blowers, the room air is discharged through the passage 2 at a rate substantially equal to the rate at which the fresh outdoor air is introduced through the passage 1 into the room. Thus, it will be appreciated that the single blower 5' provided in the second embodiment of the invention operates to discharge the room air through the outgoing room air passage 2 and through the heat exchanger 3 at a rate substantially equal to the rate at which the fresh outdoor air is introduced through the fresh air passage 1 into the room.

Exactly speaking, however, the passenger room of the motorcar is not completely sealed from the outdoor air but is communicated with the outside of the room through many small holes or openings located at several places of the car. The pressures at the outdoor sides of such holes or openings are varied with whether the car is running or stopped. Thus, the pressures at the outdoor sides of some of the holes or openings will be higher than the air pressure within the passenger room of the car when the car is running forwards. At the same time, the pressures at the outdoor sides of other holes or openings will be lower than the air pressure within the passenger room of the car. Accordingly, when the motorcar is running, the outdoor air flows through said some holes or openings into the passenger room while the room air tends to be discharged from the room through said other holes or openings. This tendency, however, is not great because there is a relatively large discharge or outgoing room air passage 2 and thus the room air is discharged through this passage at a rate much greater than that at which the room air flows from the room through said other holes or openings. Accordingly, the room air is discharged automatically through the outgoing room air passage 2 at a rate substantially equal to the rate of the air flow through the fresh air passage 1 into the room, although the rate of the room air discharge through the passage 2 is varied with the operating conditions of the motorcar. In order to enhance the automatic discharge of the room air through the passage 2, the air outlet opening 2b of the room air passage 2 will preferably be disposed at a point of the outer surface of the car where the pressure becomes lower than the atmospheric pressure during running of the car.

The second embodiment described above is advantageous in that the structure is simplified because the fresh air passage 1 only is provided with the blower 5' and that the ventilation of the room air is reliably assured despite of the single blower 5'.

The blower 5' is shown as being disposed upstream of the heat exchanger 3. The blower 5', however, may alternatively be located downstream of the heat exchanger 3.

The partition sheets 3a of the heat exchanger 3 have been described as being made either from Japanese paper or from a mixture of carbon fibers and cellulose fibers. The partition sheets 3a, however, may alternatively be made mainly from activated carbon fibers. The activated carbon fiber sheets inherently have the characteristic of solid carbon and thus provide a heat conductivity which is higher than that of sheets of a cellulosic organic material, such as Japanese paper. In addition, the activated carbon fiber sheet provides an increased surface area and thus provides an improved heat exchanging coefficient. Moreover, the activated carbon fiber sheet is operative to act as a deodorant, as discussed previously, and also operative to adsorb noxious gases such as CO.

It has been described that the spacer sheets 3b, which are placed in contact with the incoming fresh air, may be made of activated carbon fibers so as to enhance the deodorant operation of the heat exchanger 3. In addition to this, the spacer sheets 3c may also be made from activated carbon fibers so as to provide an increased surface area, improved heat conductivity and thus improved heat exchanging coefficient. In addition, the use of activated carbon fibers as the materials of the partition sheets 3a, spacer sheets 3b and spacer sheets 3c advantageously increases the productivity of the heat exchanger 3 and thus decreases the cost of manufacture thereof. The use of non-activated carbon fibers provides a similar advantage.

Figure 6:
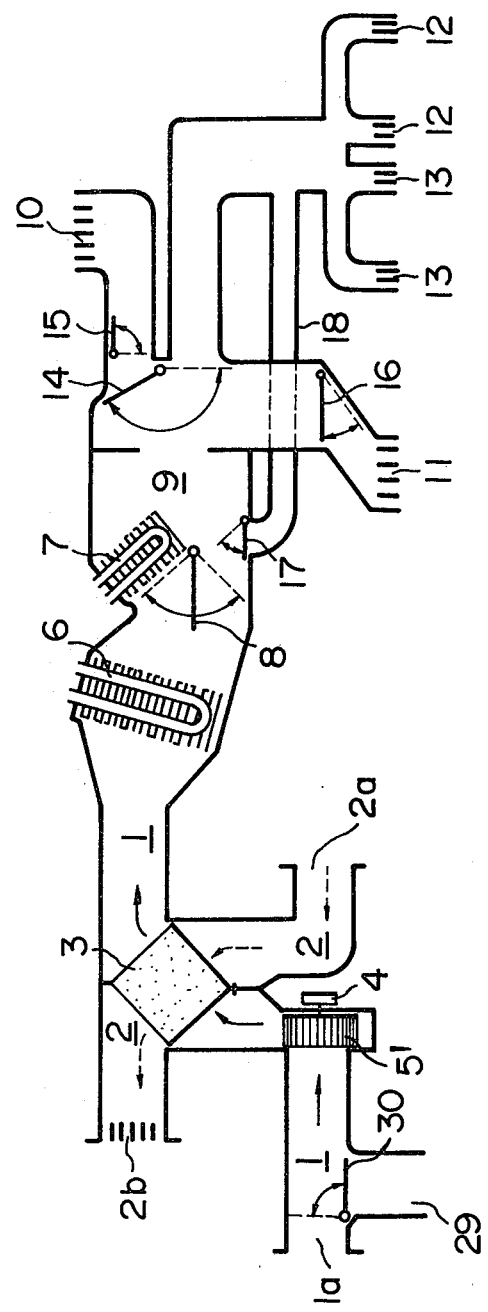
FIG. 6 is a view similar to FIG. 5 but illustrates a third embodiment of the invention.

A third embodiment of the invention is shown in FIG. 6 wherein the parts similar to those of the preceding embodiments are designated by similar reference numerals. The third embodiment is characterized in that an auxiliary room air inlet passage 29 is connected to the fresh air passage 1 between the inlet opening 1a thereof and the blower 5' in order that the room air may be introduced, when necessary, into the fresh air passage 1 and recirculated therethrough. For this purpose, a damper 30 is provided in the passage 1 at the point of connection thereof with the auxiliary passage 29. When the outdoor air is at a very high temperature or at a very low temperature or polluted, the damper 30 may be moved to the position shown by broken line in FIG. 6 to close the fresh air inlet opening 1a of the passage 1 so that the room air sucked through the auxiliary room air inlet passage 29 into the fresh air passage 1 and recirculated therethrough. The recirculated room air is reheated or re-cooled by the heater core 7 or by the cooling heat exchanger or evaporator 6. Thus, this mode of operation provides the best heating or cooling coefficient.

More specifically, when the damper 30 is in the solid line position shown in FIG. 6 to close the auxiliary room air inlet passage 29, fresh outdoor air is sucked through the fresh air inlet opening 1a into the passage 1 and thus into the room while the room air is discharged through the room air passage 2 at a rate substantially equal to the rate of the fresh air introduction through the passage 1. The fresh outdoor air and the room air both flow through the heat exchanger 3 in heat and humidity exchange relationship with each other. On the other hand, when the damper 30 is in the broken line position to close the fresh air inlet opening 1a, no outdoor air is introduced into the room but the room air is merely recirculated through the room air inlet passage 29 and through the fresh air passage 1 but is not discharged through the room air passage 2 although the passage 2 is not closed.

Figure 7:
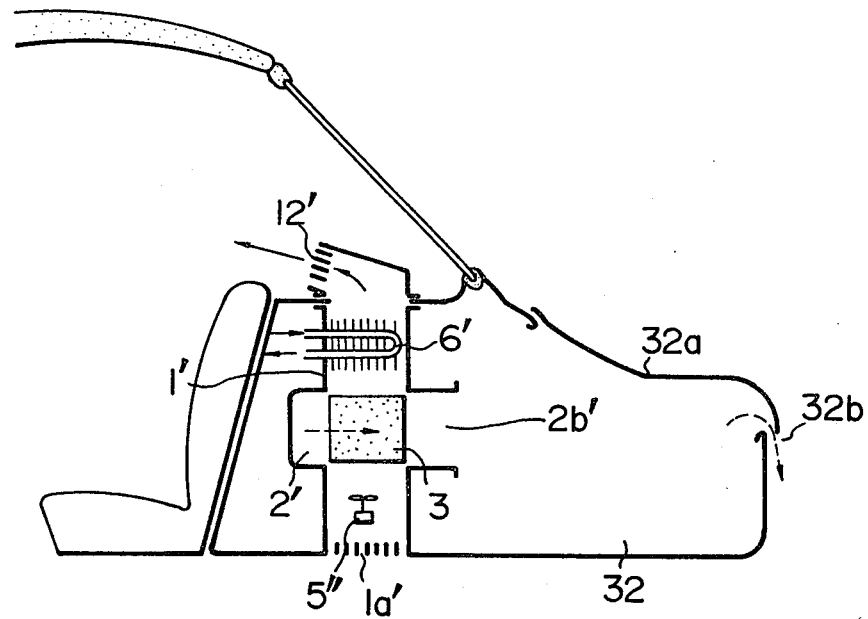
FIG. 7 is a schematic illustration of a fourth embodiment of the air conditioning and ventilation system according to the present invention.
Figure 8:
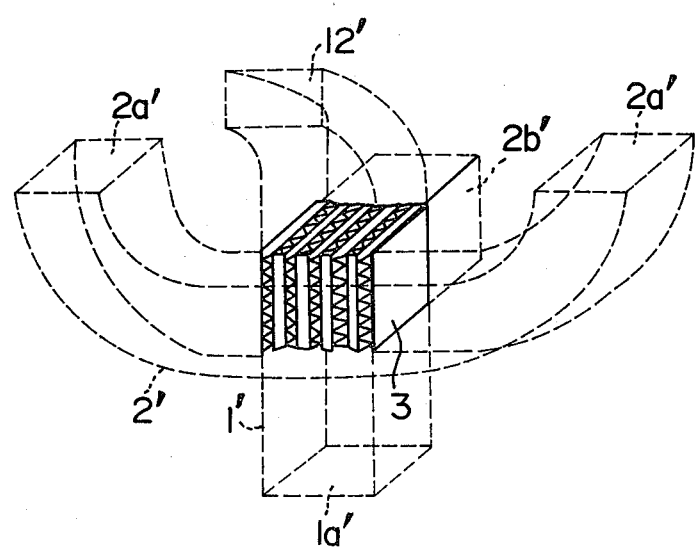
FIG. 8 is an enlarged partly perspective and partly schematic illustration of the air conditioning and ventilation system shown in FIG. 7.

FIGS. 7 and 8 show a fourth embodiment of the invention which is applied to an air conditioning and ventilation system for rear seats of a motorcar. A fresh air passage 1' is provided between the rear seats and a trunk 32 and has an air inlet opening 1a' at the bottom of the passage and an air outlet opening 12' disposed between the rear seats and the rear windshield. A room air passage 2' is generally T-shaped and has two room air inlet openings 2a' provided at the opposite ends of the two arms of the "T". The room air passage has an air outlet opening 2b' which is in communication with the trunk 32 which is sealed from the atmosphere by a trunk lid 32a excepting a ventilation passage 32b. The fresh air passage 1' intersects the stem portion of the T-shaped room air passage 2'. A heat exchanger 3 of the above-described structure is disposed at the intersection between the fresh air passage 1' and the room air passage 2' for the purpose described previously. An air cooling heat exchanger 6' is provided in the fresh air passage 1' downstream of the heat exchanger 3, while a blower 5" is provided in the fresh air passage 1' upstream of the heat exchanger 3 to introduce fresh outdoor air through the fresh air passage 1' into the passenger room. The room air is discharged through the room air passage 2' into the trunk 32 from which the room air is discharged to the outside of the motorcar through the ventilation passage 32b. The incoming and outgoing flows of airs are indicated by solid-line arrow and broken-line arrow shown in FIG. 7. The operation of the system shown in FIGS. 6 and 7 is substantially similar to those of the preceding embodiments of the invention. However, because the air conditioning and ventilation system of the fourth embodiment of the invention is disposed adjacent the rear end of the motorcar, the system of this embodiment advantageously improves the ventilation of the passenger room adjacent the rear seats.

It will be seen from the foregoing description that, since the heat exchanger 3 disposed upstream of the air conditioning means (6 and 7) is operative to exchange both of the actual heat and the latent heat of the incoming fresh outdoor air and the outgoing room air, the thermal load applied to the air conditioning means is greatly reduced than that in the prior art air conditioning and ventilation system. Accordingly, the present invention contributes to reduction in the load on the engine and thus improves the fuel consumption rate of the engine.

What is claimed is:

1. An air conditioning and ventilation system for vehicles, comprising a first passage for introducing outdoor air into the passenger compartment of a vehicle, a second passage for guiding room air from said passenger compartment to the outside of said vehicle, said first and second passages intersecting at a point, a heat exchanger disposed at said intersection of said passages to exchange the actual heat and the latent heat of the airs flowing through said first and second passages, first and second auxiliary passages respectively connecting sections of said first passage downstream of said heat exchanger to sections of said second passage upstream of said heat exchanger, first and second dampers for controlling the communications of said sections of said first passage through said first and second auxiliary passages with said sections of said second passage, respectively, the arrangement being such that, when said first and second dampers are moved to positions in which said first and second auxiliary passages are opened, the room air entering said second passage bypasses said heat exchanger and flows through said first auxiliary passage into said first passage downstream of said heat exchanger and thus into said passenger compartment and the outdoor air entering said first passage flows through said heat exchanger into said second auxiliary passage from which the outdoor air is again introduced into and flows through said heat exchanger into said second passage and is discharged therefrom into the atmosphere.

2. An air conditioning and ventilation system according to claim 1, further including means disposed in said first passage downstream of said sections of said first passage for conditioning the air flowing through said first passage into said passenger compartment.

3. An air conditioning and ventilation system for vehicles, comprising a first passage for introducing outdoor air into the passenger compartment of a vehicle, means disposed in said first passage for conditioning the air flowiing through said first passage into said passenger compartment, a second passage for guiding room air from said passenger compartment to the outside of said vehicle, said first and second passages intersecting at a point upstream of said air conditioning means, a heat exchanger disposed at said intersection of said first and second passages to exchange the actual heat and latent heat of the airs flowing through said first and second passages, and a blower disposed in said first passage, said means for conditioning air including at least one of an evaporator and a heater core respectively adapted to be operated, when necessary, to cool and heat the air which has passed through said heat exchanger and flows through said first passage toward and into said passenger compartment.

4. An air conditioning and ventilation system according to claim 3, wherein said first passage is provided with a room air inlet opening between an outdoor air inlet of said first passage and said heat exchanger, and a damper for switching over the introductions of the outdoor air and room air into said first passage.

5. An air conditioning and ventilation system according to claim 3 or 4, wherein said heat exchanger is formed by a laminated structure consisting of at least one partition sheet and a pair of spacer sheets disposed on the opposite faces of said partition sheet to cooperate therewith to define first and second serieses of passages for the flows of the outdoor air and the room air, at least one of said partition and spacer sheets being made of a paper-like sheet material comprising a mixture of carbon fibers and bond fibers.

6. An air conditioning and ventilation system according to claim 5, wherein said carbon fibers are activated carbon fibers.

7. An air conditioning and ventilation system according to claim 3 or 4, wherein said first and second passages are disposed in said vehicle rearwardly of the rear seats, said first passage having an outdoor air outlet opening disposed adjacent to said rear seats, said second passage having at least one room air inlet opening disposed adjacent to said rear seats.

* * * * *